Sept. 30, 1941. G. B. GALLASCH 2,257,233
RECORDING INSTRUMENT
Filed Nov. 13, 1939 2 Sheets-Sheet 1
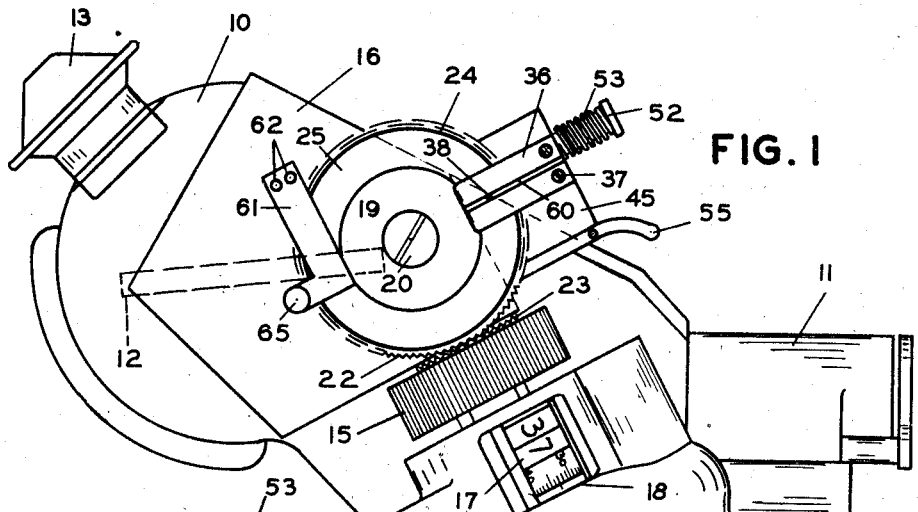
FIG. 1
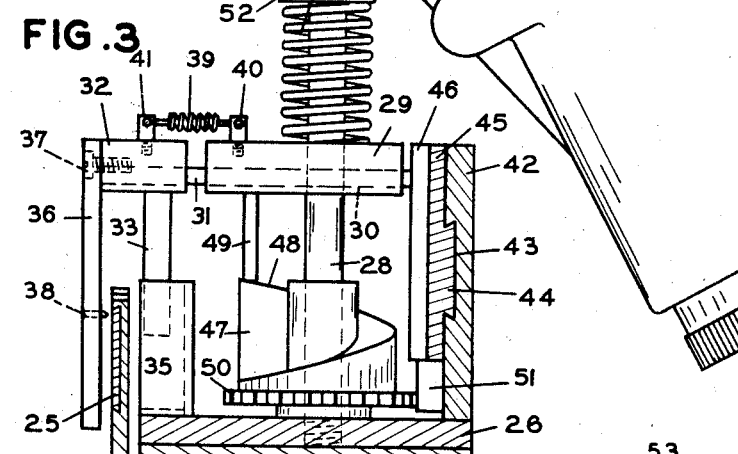
FIG. 3
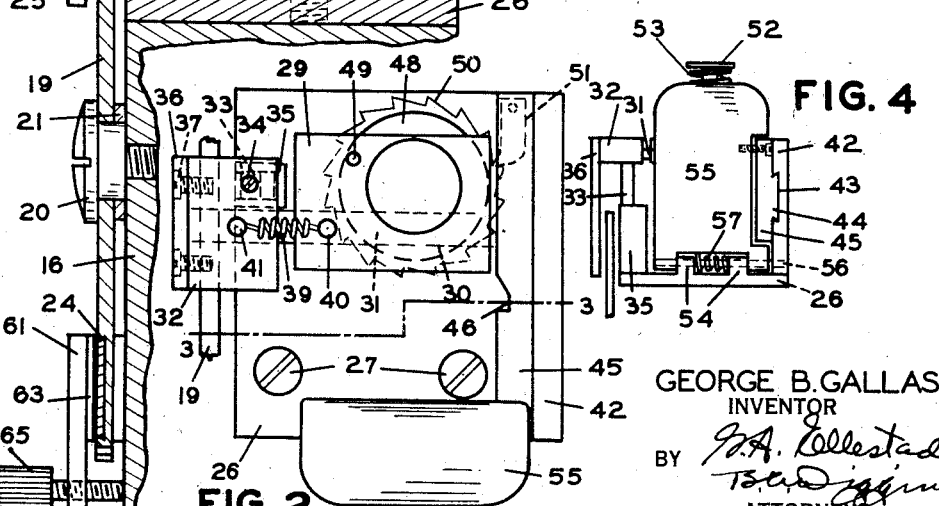
FIG. 4
FIG. 2
GEORGE B. GALLASCH
INVENTOR
BY
ATTORNEYS Sept. 30, 1941.  G. B. GALLASCH  2,257,233
RECORDING INSTRUMENT
Filed Nov. 13, 1939  2 Sheets-Sheet 2
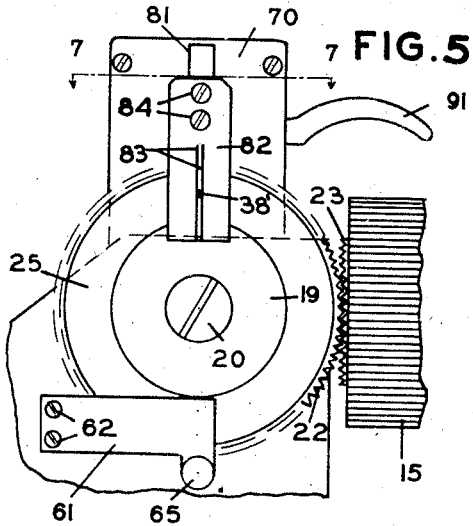
FIG.5
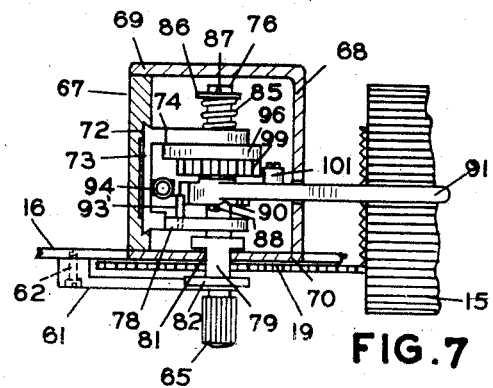
FIG.7
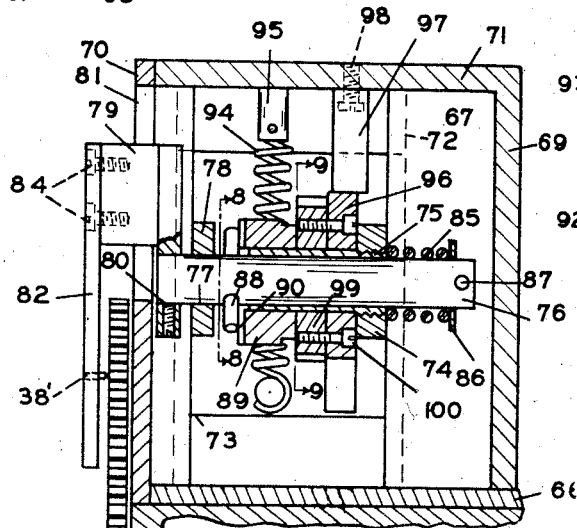
FIG.6
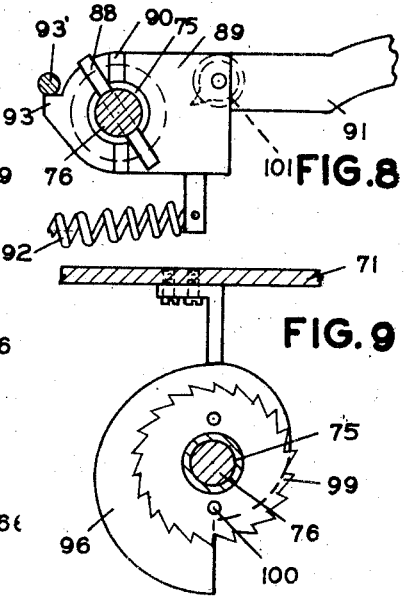
FIG.8
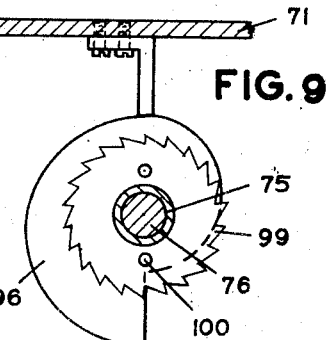
FIG.9
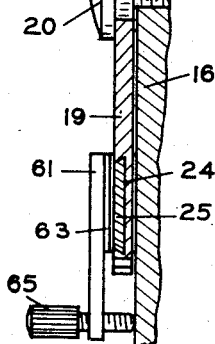
GEORGE. B. GALLASCH
INVENTOR
BY
ATTORNEYS Patented Sept. 30, 1941

2,257,233

UNITED STATES PATENT OFFICE 2,257,233

RECORDING INSTRUMENT

George B. Gallasch, Rochester, N. Y., assignor to Bausch & Lomb Optical Company, Rochester, N. Y., a corporation of New York Application November 13, 1939, Serial No. 303,951

6 Claims. (Cl. 234—1)

The present invention relates to recording devices and more particularly to recording devices for measuring instruments such as sextants, octants or the like.

One of the objects of the present invention is to provide a new and improved recording device which is simple, inexpensive and efficient and which can be applied to a wide variety of instruments. Another object is to provide a recording device in which the record can be readily removed from the surface on which it is made. A further object is to provide a recording device in which the recording surface is soft and plastic. Still another object is to provide a measuring instrument in which the quantity measured is indicated on a scale and a record made of the scale position.

The practice of navigation is made more accurate and certain when multiple sextant or octant readings are taken and a further object of this invention is to provide a sextant or octant in which a series of readings may be made and recorded.

These and other objects and advantages reside in certain novel features of construction, arrangement and combination of parts and processes as will hereinafter be more fully set forth and pointed out in the appended claims.

In the drawings:

Fig. 1 is a side elevation of an octant embodying my invention.

Fig. 2 is a plan view of my recording mechanism.

Fig. 3 is a section taken on line 3—3 of Fig. 2.

Fig. 4 is a side elevation of my new recording device.

Fig. 5 is a side elevation of a modified form of recording device.

Fig. 6 is a vertical medial section of the modification shown in Fig. 5.

Fig. 7 is a section taken on line 7—7 of Fig. 5.

Fig. 8 is a section taken on line 8—8 of Fig. 6.

Fig. 9 is a section taken on line 9—9 of Fig. 6.

Accurate navigation depends to a very large extent upon the accuracy with which an observer can determine his position relative to some celestial body. This determination can be made by taking a single sight on the body with a sextant or octant but too often errors of sighting, reading or the like give false results. This difficulty is minimized if not altogether eliminated by taking a series of sights and using the average or median reading as the true elevation.

My new recording device, though of general application, is of particular value for recording a series of sextant or octant readings and hence it is illustrated in connection with such an instrument. The particular structural features of the sextant form no part of this invention except insofar as they combine with my recording device to form a new navigational instrument of increased accuracy and utility.

A suitable sextant to which my invention may be applied is illustrated in U. S. Patent 2,080,851 issued May 18, 1937 to Henry F. Kurtz and myself for a sextant. This sextant includes the usual body 10, sighting telescope 11, tiltable index reflector 12 and observation station 13. A suitable handle 14 is fixed on the side of the body 10 and a knurled knob 15 is rotatably mounted near one end of the handle 14. This knob 15 actuates the index reflector 12 through suitable gearing, not shown, contained in a housing 16 secured on the side of the body 10. A registering or indicating device 17, actuated by the knob 15, is visible through a window 18 in the handle 14 and indicates the angular position of the index reflector 12. This and other suitable sextant structures are well known to persons skilled in the art and the exact details form no part of the present invention.

A flat disk 19 is rotatably mounted on a shoulder screw 20 which is threaded into the side wall of the housing 16 adjacent the knob 15. A washer 21 holds the disk 19 out of contact with the wall of the housing 16. Gear teeth 22 on the outer edge of the disk 19 engage gear teeth 23 on the knob 15 so that the disk 19 and knob 15 rotate together.

The disk 19 is formed with an annular groove 24 and this groove is filled with a soft, plastic material 25 which constitutes the marking surface of my recording device. Many different plastic materials may be used. For example, modelling clay, soft waxes or the modelling material sold under the trade name Plasticine may be used.

The marking mechanism of my recording device is carried by a base or support 26 which is secured to one side of the housing 16 by screws or bolts 27. A circular shaft 28 is threaded into the support 26 and projects outwardly therefrom radially of the disk 19. A carriage 29 is axially slidable on the shaft 28 and is provided with a non-circular bore 30 for slidably receiving a non-circular rod 31. A bracket 32 is rigidly fixed on the outer end of the rod 31 and a depending pin 33, secured to the bracket 32 by a screw or bolt 34, engages snugly in a guide 35 fixed on the base 26 to hold the carriage 29, rod 31 and bracket 32 against rotation about the shaft 28.

A sheet 36 of stiff transparent material such as glass or a transparent synthetic resin, is secured on the outer end of the bracket 32 by screws 37. This sheet 36 overlies the disk 19 and carries a stylus 38 in alignment with the plastic material 25 in the groove 24. A tension spring 39 is secured at one end to a lug 40 fixed on the carriage 29 and at its other end to a lug 41 fixed on the bracket 32. This spring 39 urges the bracket 32 toward the carriage 29 and urges the stylus 38 toward the plastic material 25.

A wall 42 is rigidly secured to the support 26 and extends upward past the end of the rod 31. This wall 42 is provided with a transverse groove 43 for slidably receiving the dove-tail bearing 44 of the cam plate 45. The cam plate 45 has a generally flat surface for holding the rod 31 against the tension of the spring 39 and is provided with a cam slot or recess 46 which permits the spring 39 to move the rod 31 and move the stylus 38 into engagement with the plastic 25. The stylus 38 will thus leave a depression in the soft plastic 25.

When using my recording sextant, the operator takes a rapid succession of sights on a single astronomical body. In order to prevent an overlapping or superimposition of two or more of the depressions left in the plastic 25 by the stylus 38, a cam 47 is rotatably mounted on the shaft 28 beneath the carriage 29. This cam 47 has a helical surface 48 upon which rests a follower 49 fixed on the underside of the carriage 29. A ratchet wheel 50 is fastened to the cam 47 and a pawl 51, carried by the plate 45, actuates the ratchet wheel 50 and cam 47. A spring 53, wound around the shaft 28, engages a cap 52 on the shaft 28 and presses the carriage downward toward the cam 47.

The support 26 is formed with two upstanding, spaced lugs 54 and a lever or trigger 55 is pivotally secured to these lugs by a hinge pin 56. A spring 57 is wound around the hinge pin 56 between the lugs 54 and tends to push the lever 55 outward away from the carriage 29. A suitable screw or pin 58 connects the lever or trigger 55 to the cam plate 45.

In using my new sextant, the operator takes hold of the handle 14 and operates the index reflector 12 by the knob 15 to get a sight on the astronomical body. When he has the sight, the trigger 55 is pushed toward the carriage 29 until the rod 31 drops into the cam slot 46 under the action of the spring 39. The stylus 38 then enters the plastic 25 leaving a depression. The spring 57 moves the lever 55 back to its original position and during this return movement, the pawl 51 engages the ratchet 50 and moves the ratchet 50 and cam 47 through part of a revolution. The carriage 29 which rests on the cam 47 through the follower 49 is thus raised or lowered and the stylus 38 is moved a step across the groove 24. Thus no two depressions will ever overlap or be superimposed.

If the observer is using the median technique, he takes a series of sights, twenty-one for example, and uses the middle or median sight as the correct one. The sights will normally be scattered along between two extremes and, if the observer has taken twenty-one sights, he will merely count to the eleventh mark from either extreme and use that as his correct sight.

Two parallel lines 60 are ruled on the surface of the sheet 36 tangent to the sides of the stylus 38 and extending across the groove 24. The observer rotates the knob 15 to bring the middle or median mark, for example the eleventh, between these two lines 60 and the angular elevation of the astronomical body is read on the registering or indicating device 17.

A bracket 61, secured to the housing 16 by screws 62, overlies the groove 24 in the disk 19 at some distance from the sheet 36. This bracket 61 carries a wiper 63 which is in alignment with the groove 24 but normally out of contact with the plastic 25.

After readings have been taken, the operator presses the bracket 61 to move the wiper 63 into contact with the plastic 25 and rotates the disk 19. This removes the marks and smoothes the plastic to receive another set of marks. In order to prevent the wiper 63 from gouging the plastic 25 out of the groove 24, a stop screw 65 is threaded through the bracket 61 and engages the wall 16.

The modification shown in Figs. 5 to 9 may be applied to the same type of sextant in the same way as the embodiment just described. In fact, the modification shown in Figs. 5 to 9 differs from the preceding embodiment only in the marking mechanism.

In the modification shown in Figs. 5 to 9, the operating mechanism for the stylus 38' is contained in a housing having a bottom wall 66 suitably secured to the housing 16, side walls 67 and 68, a rear wall 69, a front wall 70 and a top 71. The side wall 67 is provided with a vertical slot 72 in which a carriage 73 is vertically slidable. An end plate 74 projects outwardly from the rear of the carriage 73 and a horizontal bearing sleeve 75 is threaded into an opening in the end plate 74. A shaft 76 extends through the bearing sleeve 75 and through an opening 77 in an end plate 78 which projects outwardly from the front of the carriage 73. A bracket 79 is fixed on the front end of the shaft 76 by a set screw 80 and this bracket 79 projects forwardly through a vertical slot 81 in the front wall 70. A transparent plate 82 carrying the stylus 38' and index lines 83 is secured to the bracket 79 by screws 84 and this plate 82 extends over the groove 24 in the disk 19.

A helical spring 85 is wound around the rear end of the shaft 76 between the end plate 74 and a washer 86 which is held in place by a pin 87. This spring tends to slide the shaft 76 toward the rear wall 69 and thus tends to press the stylus 38' into the plastic 25.

The shaft 76 is held against movement by the spring 85 by a pin 88 which extends transversely through the shaft 76 and rests against the flat face of a cam 89. This cam 89 is rotatably mounted on the bearing sleeve 75 and has two radial grooves 90 into which the ends of the pin 88 may drop permitting the shaft 76 to slide under the operation of the spring 85. An operating handle 91 is rigidly secured to the cam 89 and projects outwardly through a slot in the side wall 68. This handle 91 is raised to bring the grooves 90 into position to receive the pin 88 and a spring 92 returns the handle 91 to its original position in which a lip 93 on the cam 89 engages a stop 93' fixed on the end plate 78.

A tension spring 94 fixed at one end to the carriage 73 and at the other to a lug 95 on the top 71, tends to raise the carriage and thus move the stylus 38' across the groove 24 of the disk 19. This movement is resisted by a plate cam 96 which is rotatably mounted on the bearing sleeve 75 and engages a stop 97 fixed to the top by a screw or bolt 98. A ratchet wheel 99 rotatably mounted on the bearing sleeve 75 between the cam 96 and cam 89 is rigidly secured to the cam 96 by screws or bolts 100. A pawl 101 carried by the cam 89 engages and moves the ratchet wheel 99 upon each actuation of the handle 91.

In operation, the handle 91 is raised and, when the grooves 90 are in line with the pin 88, the shaft 76 moves toward the rear wall under the action of the spring 85 and an impression is made in the plastic 25 by the stylus 38'. The spring 92 returns the handle 91 to its starting position and on this return stroke, the pawl 101 engages the ratchet 99 and moves the ratchet and cam 96 through a partial revolution. The carriage 73 is thus raised or lowered after each mark is made and the stylus 38' moved transversely of the groove 24 preventing any overlapping or superimposition of marks.

From the foregoing, it will be apparent that I am able to attain the objects of my invention and provide a new and improved recording sextant in which a multiplicity of readings may be readily and easily made. It is also apparent that my new recording mechanism may be applied to a variety of instruments. Various modifications of structure may, of course, be made without departing from the spirit of my invention or the scope of the appended claims.

I claim:

1. In a measuring instrument having a part movable to indicate the quantity measured, a recording device comprising a disk movably carried by the instrument, means operatively interconnecting the disk and the movable part whereby movement of the part moves the disk, a sheet of stiff transparent material movably carried by said instrument for movement toward and from said disk, a marking point carried by said sheet for engaging the disk to mark the disk, and a fiducial line on said sheet in predetermined relation to said marking point for locating marks on said disk.

2. A recording device comprising a supporting body, a disk movably mounted upon said body for movement in accordance with the quantity to be recorded, a layer of soft plastic material on one surface of said disk, a stylus movably carried on said body for movement toward and from said plastic material, spring actuated means connected to said stylus for normally urging the stylus into contact with the plastic material on said disk, cam means carried on said body for controlling the movement of said stylus to allow it to contact said plastic material and for withdrawing it from such contact therewith, other cam means carried on said body for moving said stylus radially of said disk and across said plastic material when the stylus is withdrawn from contact therewith, and movable drive means carried on said body and operably connected to both of the cam means for actuating said cam means, said movable drive means being manually operable in one direction against the action of a spring member when actuating said first mentioned cam means for allowing the stylus to contact the plastic material and being operably driven by said spring member in a direction reverse to that first mentioned to actuate the first cam means to move the stylus out of contact with the plastic material and also to actuate said second cam means for moving the stylus radially of said disk.

3. In a measuring instrument having a part movable to indicate the quantity measured, a recording device comprising a disk rotatably mounted on said instrument and having an annular groove therein, a soft plastic material in said groove, means operatively interconnecting the disk and the movable part whereby movement of the part rotates the disk, a bracket movably mounted on said instrument and extending over the groove in said disk, a stylus carried by said bracket for indenting said plastic material, means for moving said bracket substantially perpendicular to said disk to press the stylus into the plastic material and means for moving said bracket transversely of said disk across said groove when said stylus is withdrawn from contact with said plastic material.

4. A recording device for recording the movement of a movable part of a measuring instrument wherein said part is moved upon actuation of movable means carried by the instrument, said device comprising a disk rotatably mounted on said instrument and having an annular groove therein, a soft plastic material in said groove, means for operatively interconnecting said movable means and said disk whereby operation of said movable means rotates said disk, a bracket movably mounted on said instrument and extending over the groove in said disk, a stylus carried by said bracket for indenting said plastic material, control means for effecting the movement of said bracket toward and from said disk and the stylus into and out of contact with the plastic material, cam actuated means for moving said bracket substantially transversely of said disk across said groove when said bracket is free from contact with said plastic material, and means operatively interconnecting said control means and said cam actuated means whereby movement of said control means to withdraw the stylus from the plastic material will cause the movement of said cam actuated means.

5. In a measuring instrument having a part movable in accordance with the quantity measured and movable means for actuating said part, the combination of a recording device comprising a disk rotatably mounted on said instrument and having an annular groove, means for operatively interconnecting said disk and said movable means whereby movement of said movable means causes rotation of said disk, a soft plastic material positioned in said groove, a stylus movably mounted on said instrument adjacent said disk, means for moving said stylus into said material to make a depression in said material, and means for moving said stylus transversely of said groove when said stylus is withdrawn from contact with said plastic material.

6. A recording device for use with a measuring instrument, said device comprising a disk rotatably mounted on the instrument for rotation in accordance with the quantity to be recorded, said disk having an annular groove, a soft plastic material positioned in said groove, a stylus movably mounted on said instrument adjacent said disk, means for moving the stylus into said material to make a depression therein, means for moving said stylus transversely of said groove when the stylus is out of contact with said plastic material and means carried by said instrument for indicating when a given depression is in alignment with said stylus.

GEORGE B. GALLASCH.